(12) United States Patent
Chang et al.

(10) Patent No.: US 11,283,496 B1
(45) Date of Patent: Mar. 22, 2022

(54) MULTIPLE INPUT MULTIPLE OUTPUT RADIO INTERFERENCE SUPPRESSION AND RANGE EXTENSION

(71) Applicant: Vencore Labs, Inc., Basking Ridge, NJ (US)

(72) Inventors: Nicholas Chang, Basking Ridge, NJ (US); Eddie Fung, Basking Ridge, NJ (US); James Hodge, Basking Ridge, NJ (US)

(73) Assignee: PERSPECTA LABS INC., Basking Ridge, NJ (US)

(*) Notice: Subject to any disclaimer, the term of this patent is extended or adjusted under 35 U.S.C. 154(b) by 742 days.

(21) Appl. No.: 16/225,478

(22) Filed: Dec. 19, 2018

Related U.S. Application Data (60) Provisional application No. 62/607,627, filed on Dec. 19, 2017.

(51) Int. Cl.
| | |
|---|---|
| *H04B 7/02* | (2018.01) |
| *H04B 7/0426* | (2017.01) |
| *H04B 1/10* | (2006.01) |
| *H04B 7/08* | (2006.01) |
| *H04B 7/06* | (2006.01) |
| *H04L 25/02* | (2006.01) |

(52) U.S. Cl.
CPC ............ *H04B 7/0434* (2013.01); *H04B 1/10* (2013.01); *H04B 7/0617* (2013.01); *H04B 7/086* (2013.01); *H04B 7/0857* (2013.01); *H04L 25/0204* (2013.01)

(58) Field of Classification Search
CPC .... H04B 7/0434; H04B 7/086; H04B 7/0617; H04B 7/0857; H04B 1/10; H04L 25/0204

USPC .......................................... 375/267; 455/101
See application file for complete search history.

(56) References Cited

U.S. PATENT DOCUMENTS

| | | | | |
|---|---|---|---|---|
| 2003/0086366 | A1* | 5/2003 | Branlund | H04B 1/71052 370/208 |
| 2013/0128935 | A1* | 5/2013 | Janani | H04B 7/0413 375/222 |
| 2016/0018510 | A1* | 1/2016 | Dokmanic | G01S 5/18 367/119 |
| 2020/0052852 | A1* | 2/2020 | Vitthaladevuni | H04B 7/063 |

* cited by examiner

*Primary Examiner* — Don N Vo
(74) *Attorney, Agent, or Firm* — Heslin Rothenberg Farley & Mesiti P.C.

(57) ABSTRACT

A computer-implemented method, a computer program product, and a system include a processor(s) that produces a set of beamforming vectors, each vector produced based on a distinct set of parameters. To produce vector of the vectors, the processor(s) obtains, from receive antennas, data comprising a waveform comprising slots with boundaries, from a first collection window. The processor(s) determines the parameters (e.g., silent portion length and signal portion length) and determines which slots of the waveform contain signal operating instructions. The processor(s) aligns the slot boundaries, utilizing the data, based on determining which slots of the waveform contain signal operating instructions. The processor(s) extracts the signal portion and the silent portion, determines a covariance for each, and determines a vector and eigenvalue. From the set, the processor(s) selects a vector and applies the vector to a second collection window to suppress interference in data received within the second collection window.

20 Claims, 8 Drawing Sheets

FIG. 9

MULTIPLE INPUT MULTIPLE OUTPUT RADIO INTERFERENCE SUPPRESSION AND RANGE EXTENSION

CROSS-REFERENCE TO RELATED APPLICATION

This application claims priority to U.S. Provisional Application No. 62/607,627 filed Dec. 19, 2017, entitled, "MULTIPLE INPUT MULTIPLE OUTPUT RADIO INTERFERENCE SUPPRESSION AND RANGE EXTENSION" which is incorporated herein by reference in its entirety.

GOVERNMENT RIGHTS STATEMENT

This invention was made with U.S. Government support under contract number 2262-2 awarded by Air Force Research Laboratory. The government has certain rights in the invention.

BACKGROUND OF INVENTION

A standard issue with portable devices is quality of reception and transmission may be compromised by interference, especially in certain environments where the number of interferers is large and not preventable. The types of interferences encountered may be difficult to predict and modifying the components of these model devices to implement an internal solution is not only expensive, but can also negatively impact the portability of the device. However, implementing an external solution can increase the size and weight of the device in a manner that makes carrying the device cumbersome.

SUMMARY OF INVENTION

Shortcomings of the prior art are also overcome and additional advantages are provided through the provision of a system and method for suppressing interference in a portable device. The method includes, for example: producing, by one or more processors, a set of beamforming vectors and associated eigenvalues, wherein the set of beamforming vectors comprises one or more individual beamforming vectors, and wherein each beamforming vector is produced based on a distinct set of parameters, the producing comprising, for each individual beamforming vector of the beamforming vectors: obtaining, by the one or more processors, from a plurality of receive antennas communicatively coupled to the one or more processors, data comprising a waveform comprising slots, wherein the slots comprise slot boundaries, from a first collection window; determining, by the one or more processors, which slots of the waveform contain signal operating instructions; aligning, by the one or more processors, the slot boundaries, utilizing the data, based on determining which slots of the waveform contain signal operating instructions, wherein the aligning comprises identifying a signal portion of the slots where the signal operating instructions are transmitting and a silent portion of the slots, where the signal operating instructions are not transmitting; based on aligning the slot boundaries, extracting, by the one or more processors, separately, from the data, the signal portion and the silent portion; determining, by the one or more processors, a covariance for the silent portion of the slots and a covariance for the signal portion of the slots; and determining, by the one or more processors, based on the covariance of the silent portion and the covariance of the signal portion, the individual beamforming vector and associated eigenvalue of the individual beamforming vector; selecting, by the one or more processors, a given beamforming vector, from the set of beamforming vectors, wherein the given beamforming vector is associated with a maximum eigenvalue of the associated eigenvalues of the set of beamforming vectors; and applying, by the one or more processors, the given beamforming vector to a second collection window to suppress interference in data received, by the one or more processors, within the second collection window.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics professor unit). Additionally, items denoted as processors may include hardware and/or software processors or other processing means, including but not limited to a software defined radio and/or custom hardware.

Embodiments of the present invention include a component that may be coupled to an existing device to reduce interference without modifying existing components. Embodiments of the present invention may include both hardware and/or software implementations, including but not limited to utilization of a field-programmable gate array (FPGA) to execute one or more algorithm. The FPGA embodiments balancing size, weight and power (SWaP) and is thus considered low SWaP hardware. Embodiments of the present invention include one or more programs that suppress interference without knowledge of interference or protected signal waveform contents. Aspects of the present invention are portable to various mobile devices (e.g., radios and waveforms). In embodiments of the present invention, one or more programs leverage multiple receive antennas and utilize a covariance-based approach to simultaneously protect multiple signals of interest and suppress multiple jammers. Some embodiments of the present invention may reduce interference power by up to 30 dB, and are robust to Doppler shifts greater than 10 Hz. due to movement of protected radios and interfering signal validating requests to a host from a client.

Embodiments of the present invention include a computer-implemented method, a computer program product, and a computer system that include one or more programs, optionally executing on an FPGA communicatively and/or physically coupled to a mobile device, that leverage multiple receive antennas and a covariance-based approach to simultaneously protect multiple signals of interest and suppress multiple jammers by detecting signals of interest under strong interference and self-leakage, without knowledge of the waveform contents. Embodiments of the present invention include a physical device, such as an FPGA, that attaches to portable devices, such as radios and various communication devices, and reduces interference without modifying existing components. Embodiments of the present invention provide interference suppression for signals of varying and/or unknown length.

Figure 1:
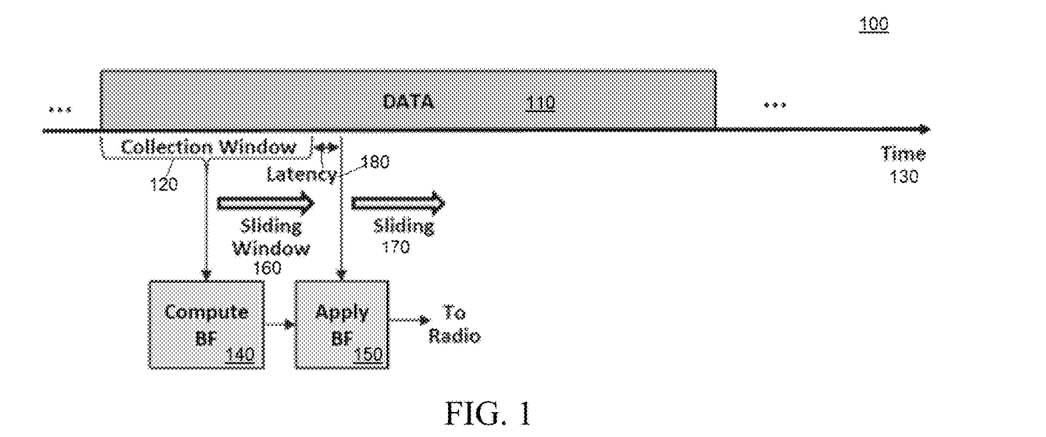
FIG. 1 depicts a workflow illustrating various aspects of some embodiments of the present invention.

In some embodiments of the present invention, one or more programs obtain and process data as blocks of a given length, based on a number n of receive antennas of the multiple-input multiple-output (MIMO) device. The one or more programs select the length of a block that will enable balancing processing power (increases with longer blocks) and tolerance of residual frequency drift (motivates using shorter blocks), and can be parameterized depending on the amount of motion and environmental dynamics. This approach may be characterized as a sliding window approach. FIG. 1 illustrates a workflow 100 of one or more programs in embodiments of the present invention that process incoming data utilizing a sliding collection. Specifically, the one or more programs utilize a given sample of data 110 to estimate a beamforming vector (i.e., compute BF 140) and apply that vector (i.e., apply BF 150) to a later sample. The one or more programs repeat this process as the collection window 120 and sample 110 both slide in time 130. The sliding is illustrated as a sliding window 160 and continuous sliding 170, in FIG. 1. The latency 180 is also illustrated. By estimating a vector with data from a first window (e.g., collection window 120) and applying the vector to the next window, the one or more programs introduce an efficiency into the system that would not be possible if a vector from a given window (e.g., collection window 120) were applied to the same window. Computing a vector using data from a given window (e.g., collection window 120) and applying the vector to the same window delays processing by at least the collection window length plus processing time, which is avoided in embodiments of the present invention utilizing the described and illustrated (e.g., FIG. 1) sliding window approach.

Referring to FIG. 1, the one or more programs in embodiments of the present invention divide incoming data into collection windows (e.g., collection window 120). In FIG. 1, the one or more programs utilize the current collection window N (e.g., collection window 120), for computation and estimation of a digital beamforming vector. In order to meet latency 180 requirements in handing clean data to the MIMO device in a timely fashion, the beamforming vector computed by the one or more programs in window N is applied, by the one or more programs, to data for collection window N+1 (e.g., collection window 120 is N and the latency 180 is 1). The one or more repeat this process for each window (e.g., the one or more programs apply the beamforming vector of window N+1 to window N+2, etc.). Data within a given collection window is used to determine the beamformer vector for the next window.

In embodiments of the present invention, the size of a collection window may vary and can depend on multiple parameters. For example, the window may be selected as having a duration sufficient to include, in each window, emanations from the signal operating instructions (SOI) and interferers. Utilizing longer windows, which would include these emanations, leads to larger integration gain and improved ability to suppress high-power interfering signals. However, longer windows also have some drawbacks, as window length increases the delay between estimation and application of the computed beamforming vector. In highly dynamic environments, due to motion of either the transmitter/receiver radios or external objects, the optimal beamforming vector changes very quickly, necessitating, in these circumstances, a shorter gap, for the one or more programs, between estimation and application of the vector.

Figure 2:
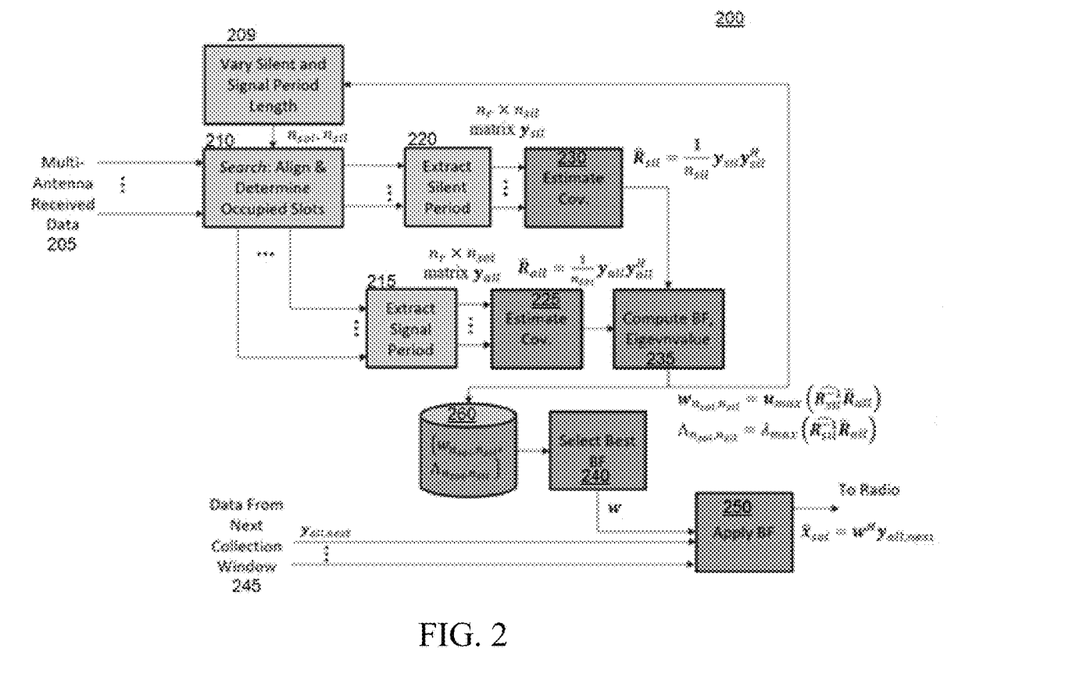
FIG. 2 depicts a workflow illustrating various aspects of some embodiments of the present invention.

FIG. 2 is a workflow 200 that provide an overview of various aspects of processing by the one or more programs in embodiments of the present invention. FIG. 2 can be understood as an expansion of various aspects of FIG. 1. In particular, FIG. 2 illustrates aspects of a digital processing algorithm, called Multiple Antenna Digital Interference Suppression Algorithm (MADISA), utilizing $n_r$ receive antennas, which is applied by the one or more programs in embodiments of the present invention. The $n_r$ receive antennas interface between the electric circuit (e. g., one or more processors) and space and transmit and receive electromagnetic waves.

As illustrated in FIG. 2, the one or more programs executing on one or more processors communicatively coupled to the $n_r$ receive antennas, align slot boundaries, ultimately, to suppress interference and extend range. In order to align the boundaries, the one or more programs perform a search to align and determine occupied slots. This includes the one or more programs blindly aligning the slot boundaries of the transmitting signal, and determining which slots of the captured waveform contain SOI signals. SOI signals are orders issued for the technical control and coordination of communications and include current and up-to-date information covering radio call signs and frequencies, a telephone directory, code-words (for rudimentary encryption), and visual and sound signals. Although SOIs are utilized herein as an example of a specific instruction or command upon which to align slot boundaries, other embodiments of the present invention can be configured to align based on different distinctive communications contained within signals received by antennas. Thus, SOIs are used herein as one example, for illustrative purposes only, and do not suggest any technical limitations.

Before performing this search to align and determine occupied slots, the one or more programs synchronize the inter-antenna samples to each other in both time and frequency. In order to align the slot boundaries, in some embodiments of the present invention, the one or more programs receive data related to the SOI signaling, including but not limited to, the slot length, timing information for a pulsed time division multiple access (TDMA) system or the preamble, if waveform contents are known. As understood by one of skill in the art, TDMA is a channel access method for shared-medium networks. It allows several users to share the same frequency channel by dividing the signal into different time slots, referred to herein as slots. The users transmit in rapid succession, one after the other, each using its own time slot. This allows multiple stations to share the same transmission medium (e.g., radio frequency channel) while using only a part of its channel capacity. Presently, TDMA is used in the digital 2G cellular systems such as Global System for Mobile Communications (GSM), IS-136, Personal Digital Cellular (PDC) and iDEN, and in the Digital Enhanced Cordless Telecommunications (DECT) standard for portable phones. It is also used extensively in satellite systems, combat-net radio systems, and passive optical network (PON) networks for upstream traffic from premises to the operator. For usage of Dynamic TDMA packet mode communication, see below. TDMA is a type of time-division multiplexing (TDM), with the special point that instead of having one transmitter connected to one receiver, there are multiple transmitters (e.g., $n_r$ receive antennas). As illustrated in FIG. 2m data is received by multiple antennas (205). In the case of the uplink from a mobile phone to a base station this becomes particularly difficult because the mobile phone can move around and vary the timing advance required to make its transmission match the gap in transmission from its peers. Referring to FIG. 2, aspects depicted subsequent to the Search: Align & Determine Occupied Slots (210) do not require protocol knowledge. All aspects of MADISA executed by one or more programs in embodiments of the present invention do not require waveform knowledge.

Referring to FIG. 2, after aligning the slot boundaries (210), one or more programs, in embodiments of the present invention, extract a signal portion of a block (i.e., the portion of the slots where the SOIs are transmitting) (215) as well as a silent portion of the block (i.e., the portion of the slots where the SOIs are not transmitting) (220). The SOI interval (SOI is used herein as an example and is non-limiting) is based on the input signal being aligned from the previous block, as illustrated in FIG. 1, and adjustment to a known starting point, since the start and stop times can be deduced based on occupied slots. As understood by one or skill in the art, the SOI is an effective command to utilize as an example because the SOI consolidates all signal information that is pertinent to an operation into a single master document and can contain elements, including but not limited to: handling instructions, an index, radio call signs (to identify users), field telephone instructions and wire tagging system, visual signals, sound signals, signs and countersigns, transmission security instructions, a key list, an operations code, authentication instructions, and/or transmission authentication tables. Portions of the SOI are then extracted and issued to those personnel that have a need. Because of the amount of useful data included in an SOI, the advantages utilizing aspects of embodiments of the present invention to reduce interference can be realized utilizing an SOI.

Returning to FIG. 2, the one or more programs determine covariance from the signal portion (225) and determine covariance from the silent portion (230), and utilize the covariance to compute a beamforming vector as well as an associated eigenvalue (235). The one or more programs apply the beamforming vector to the data to form a single output stream with the interference suppressed (250). By determining the covariance from the signal portion (225) and the covariance from the silent portion (230), the one or more programs can estimate a covariance matrix for the signal portion and a covariance matrix for the silent portion. The one or more programs determine the beamforming vector and associated eigenvalue of the individual beamforming vector (235), based on the covariance matrix for the signal portion and the covariance matrix for the signal.

In some embodiments of the present invention, before selecting or determining a best beamforming vector (240) to apply to data from a next collection window (245), the program code effectively tests multiple combinations of silent and signal lengths. Here, the best beamforming vector is determined as the one which maximizes the signal-to-interference-plus-noise ratio (SINR), and can be determined as the beamforming vector with highest computed eigenvalue (235). As understood by one of skill in the art, the SINR, also known as the signal-to-noise-plus-interference ratio (SNIR), is a quantity used to determine theoretical upper bounds on channel capacity (or the rate of information transfer) in wireless communication systems such as networks. The SINR can be defined as the power of a certain signal of interest divided by the sum of the interference power (from all the other interfering signals) and the power of some background noise. Thus, if the power of noise term is zero, the SINR reduces to the signal-to-interference ratio (SIR). Conversely, zero interference reduces the SINR to the signal-to-noise ratio (SNR), which is used less often when developing mathematical models of wireless networks such as cellular networks. Thus, for the different parameters, the program code executing on the one or more processors (also referred to as one or more programs) repeats the search to align and determined occupied slots (210), which includes extracting the periods, silent (220) and signal (215), estimating convergence for each (230) (225), and computing a beamforming vector (235).

Based on the multiple combinations of silent and signal lengths, the program code has generated more than one distinct beamforming vector (260), from which the program code selects a given beamforming vector (240) (e.g., the best beamforming vector, meaning the beamforming vector which maximizes the signal-to-interference-plus-noise ratio (SINR) and is associated with the highest eigenvalue determined by the program code (235). The program code applies the best beamforming vector (250), determined based on data (205) received during a first window of time, to data from a second collection window, the next window of time (245). In some embodiments of the present invention, the first collection window and the second collection window are of the same size and the second follows the first, immediately.

Returning to the Search: Alignment and Determination of Occupied Slots (220) aspect of FIG. 2, in some embodiments of the present invention, the one or more programs align received data to the SOI slot boundaries based on the signaling mechanisms employed by the SOI systems. Depending on the amount of information the one or more programs can obtain (or can be pre-programmed into the FPGA) about the SOI, the one or more programs may obtain information from the multiple access control (MAC) layer (i.e., multiple-access scheme and associated parameters) and/or physical layer (PHY) waveform features (e.g., preamble, synchronization sample values, modulation features (e.g., cyclic prefix for orthogonal frequency-division multiplexing OFDM)).

In some embodiments of the present invention, the one or more programs (also referred to as the program code) can be applied to a carrier-sense multiple access protocol, where the specific waveform features (such as preamble values) are unknown or not used by the one or more programs. With unknown values, the one or more programs may utilize a guard period between data transmissions to reduce inter-user interference, be robust to propagation delays, and allow for hardware initiation.

Figure 3:
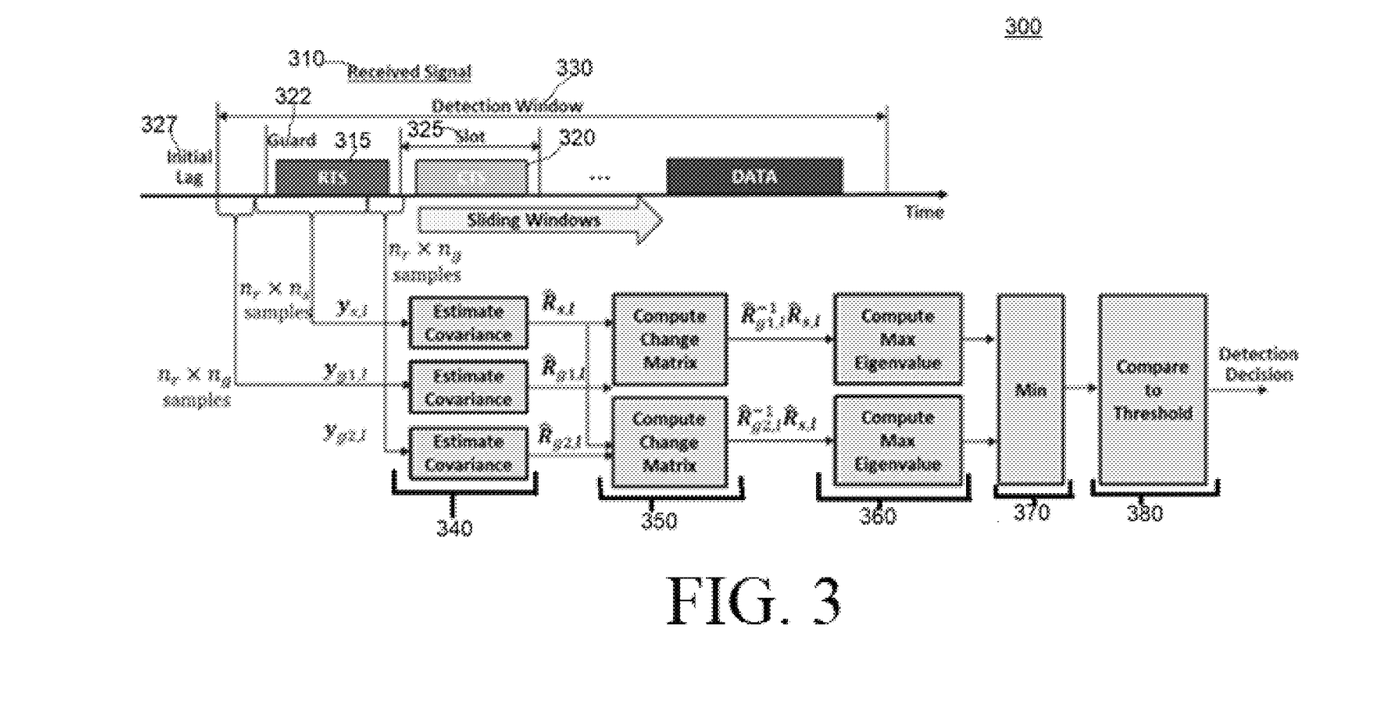
FIG. 3 depicts a workflow illustrating various aspects of some embodiments of the present invention.

FIG. 3 is a workflow 300 that illustrates computations by one or more programs in embodiments of the present invention to align with SOI and non-SOI (guard) boundaries (utilizing SOI as an example). Aspects of the processing by the one or more programs may be characterized as a MADISA approach, based on the aforementioned algorithm. The one or more programs leverage multiple antennas to align incoming data with the correct boundaries for guard and data intervals. The one or more programs hypothesize over different lag values, and utilize an eigenvalue-based metric to optimally determine the lag value. The one or more programs obtain parameters including the lengths of slot, data, and guard periods, in advance of determining the alignment.

Referring to FIG. 3, $n_r$ represents a number of receive antennas, $n_s$ is the number of samples received 310 for RTS (Request to Send) 315 and/or CTS (Clear to Send) 320 packet, and $n_g$ is the number of samples per each guard period (before or after transmission) 322 in a slot 325. As indicated in FIG. 3, the incoming samples have an initial lag 327 with respect to the true starting position. Using this initial starting position for a detection window 330 (integer number of slots), the one or more programs collect samples for the (hypothetical) two guard periods and one RTS/CTS (i.e., control) period. These samples are denoted as an $n_r \times n_s$ matrix $y_{s,l}$ for the hypothesized control period and $n_r \times n_g$ matrices $y_{g1,l}, y_{g2,l}$ for the hypothesized guard periods. The one or more programs denote and compute covariance matrices (340) of the two guard and one data by applying the equations below, respectively.

$$\hat{R}_{g1,l} = \frac{1}{n_g} y_{g1,l} y_{g1,l}^H, \hat{R}_{g2,l} = \frac{1}{n_g} y_{g1,l} y_{1,l}^H$$

$$\hat{R}_{s,l} = \frac{1}{n_g} y_{s,l} y_{s,l}^H$$

The parameter l is the offset from the initial lag, and initially set to 0. The max eigenvalue of each of the change matrices (which are both noted below) is computed by the program code (350). As discussed in reference to FIG. 2, the program code utilizes the eigenvalues, each being associated with a beamforming vector (e.g., FIG. 2, 235) to select the beamforming vector which maximizes the signal-to-interference-plus-noise ratio (SINR) (i.e., is associated with the highest eigenvalue). Returning to FIG. 3, the computation of the matrices by the program code in some embodiments of the present invention is provided below.

$$C_{l,1} = \hat{R}_{g1,l}^{-1} \hat{R}_d^l$$

$$C_{l,2} = \hat{R}_{g2,l}^{-1} \hat{R}_d^l$$

The eigenvalues above are computed by the one or more programs (360) because whenever there is a signal present in a data period, which is not in the first or the second guard periods, both eigenvalues are large, which is possible when a signal is on for longer than $n_s$ samples. This condition could occur in a time-slotted carrier-sense multiple access (CSMA) system which utilizes multiple contiguous slots to transmit data packets, as illustrated by the relative lengths of the RTS, CTS, and DATA transmissions in FIG. 3. Thus, the first guard period may only contain interference and noise while both the (hypothesized) control and second guard periods contain DATA, thus leading to large first max eigenvalue ($\lambda_1(C_{l,1})$) and a small max second eigenvalue ($\lambda_1(C_{l,2})$). When executing alignment, the one or more programs in an embodiment of the present invention is interested in finding control packets, rather than longer DATA portions. Thus, the one or more programs (of the FPGA and/or executed by a processor) return a detection when both max eigenvalues are small. This the one or more programs utilize a detection metric to compute minimum eigenvalues (370).

If the maximum eigenvalue does not exceed the threshold, then the value of l is incremented and the one or more programs repeat this portion of the workflow in FIG. 3 until the value exceeds the threshold (380). In various embodiments of the present invention, the size of the detection window can vary and can be any integer number of slots, with the value being dependent on the minimum signal-to-interference-plus-noise ratio (SINR) level and processing capability. With longer detection windows, the one or more programs attain more integration gain (i.e., this power gain grows linearly with the number of samples) but the implementation of this procedure may involve the one or more programs buffering more samples.

The one or more programs compute the maximum eigenvalues of the change matrices for different lags. However, this calculation (see, e.g., FIG. 3) can be computationally expensive if all of the aspects of the workflow of FIG. 3 are computed from scratch for each value of l. Thus, in some embodiments of the present invention, the one or more programs can utilize existing relationships between various values to avoid a potentially expensive computation. In some embodiments of the present invention, the one or more programs executed Cholesky updates in order to reduce the number of computations for successive offset values. For example, a correlation exists between covariance matrices for consecutive offset values; $\hat{R}_{s,i}$ can be computed from $\hat{R}_{s,i-1}$. In some embodiments of the present invention, the one or more programs (of the FGPA and/or executed by at least one processor) add the covariance from the new $n_s$ values in the new (next) window, while subtracting out covariance from the $n_s$ old values, where $n_s$ represents a number of slots in the given detection window.

Figure 4:
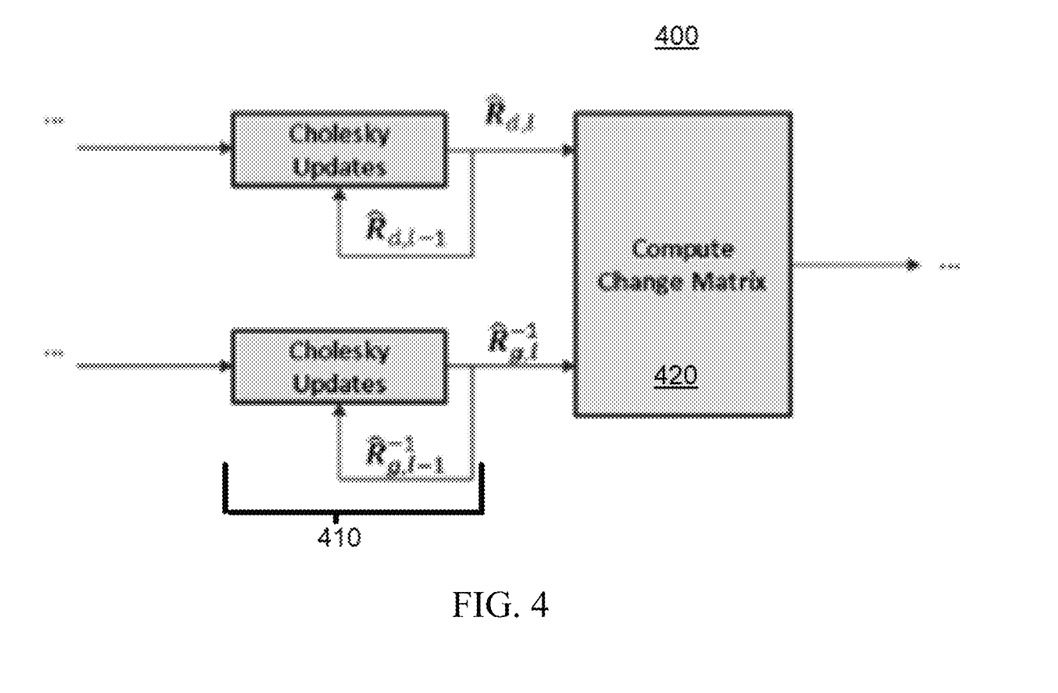
FIG. 4 depicts a workflow illustrating various aspects of some embodiments of the present invention.

FIG. 4 illustrates the utilization of one-step Cholesky updates 400, by the one or more programs, to reduce the number of redundant operations between successive offset values. As illustrated in FIG. 4, the one or more programs utilize decompositions of $\hat{R}_{d,l}$ and $\hat{R}_{g1,l}^{-1}, \hat{R}_{g2,l}^{-1}$ to efficiently update the values. By performing the one-step Cholesky updates (410), the one or more programs directly update the matrix inverses $\hat{R}_{g1,l}^{-1}, \hat{R}_{g2,l}^{-1}$ and avoid any requirement of computing matrix inversion for each offset value (420).

In some embodiments of the present invention, determining maximum eigenvalues (i.e., $\lambda_1(C_{l,1})$, $\lambda_1(C_{l,2})$) for each value l can be expensive (from a processing standpoint, introducing a possible ineflicieny). Thus in some embodiments of the present invention, the one or more programs approximate these values with trace values (e.g., $tr(C_{l,1})$, $tr(C_{l,2})$), utilizing the minimum of the trace values as a detection metric.

Returning to FIG. 2, after aligning the slots (210), the one or more programs extract both the signal (215) and the silent (220) period. As seen in FIG. 2, the concatenated data that results from extraction of the silent data is denoted as the $n_r$ by $n_{sil}$ matrix $y_{sil}$, while the data that results from extraction of the signal data is denoted as the $n_r$ by $n_{soi}$ matrix $y_{all}$. The subscript "all" denotes that the SOI and interferers could all be present during the collection segment. In an embodiment of the present invention, the collection window and detection window lengths are not equal, the one or more programs compute the beamforming vector based on the entire collection window. The one or more programs extract concatenated SOI signals from the data portions of the collection window. The one or more programs (e.g., one or more digital processor) extract the silent portion of the data, where the SOI is off, but interference and noise might still be present.

As illustrated in FIG. 2, after the one or more programs extract the signal and silent data (215) (220), the one or more programs utilize the extracted (concatenated) data to estimate the covariance for both the signal (225) and silent (225) periods. The covariance matrices for the signal and silent periods are noted below, respectively.

$$\hat{R}_{ai,l} = \frac{1}{n_{soi}} y_{ail} y_{ail}^H$$

$$\hat{R}_{sil} = \frac{1}{n_{sil}} y_{sil} y_{sil}^H$$

In each covariance, H denotes a conjugate transpose (i.e., Hermitian) operator.

The one or more programs utilize the covariance matrices to determine a beamforming vector (and an associated eigenvalue) (235) and ultimately, to apply the beamforming vector (to the data from the next collection window) (250). The beamforming vector whitens the received data by the covariance of interference and noise, and then projects to the resulting principal component, which one or more programs align with the channel to the SOI system. To this end, in some embodiments of the present invention, the one or more programs determine the $n_r$ by 1 beamforming vector (i.e., w) (235) utilizing the equation below, where $u_{max}$ denotes a singular vector corresponding to the largest eigenvector (i.e., the dominant eigenvector of the value in parenthesis).

$$w = u_{max}\left(\hat{R}_{sil}^{-1} - \hat{R}_{all}\right)$$

The corresponding eigenvalue is computed by the program code as:

$$\Lambda_{n_{soi},n_{sil}} = \lambda_{max}\left(\hat{R}_{sil}^{-1} \hat{R}_{all}\right)$$

In embodiments of the present invention, provided that the one or more programs are able to obtain waveform training sequences in order to estimate an $h_{soi}$ value, the one or more programs may utilize the equation below to determine the beamforming vector (for application to the data window).

$$w = R_{sil}^{-1} h_{soi}.$$

Utilizing the calculation above, the one or more programs utilizes a maximum SINR beamformer, which projects along the channel matrix to the SOI.

Figure 5:
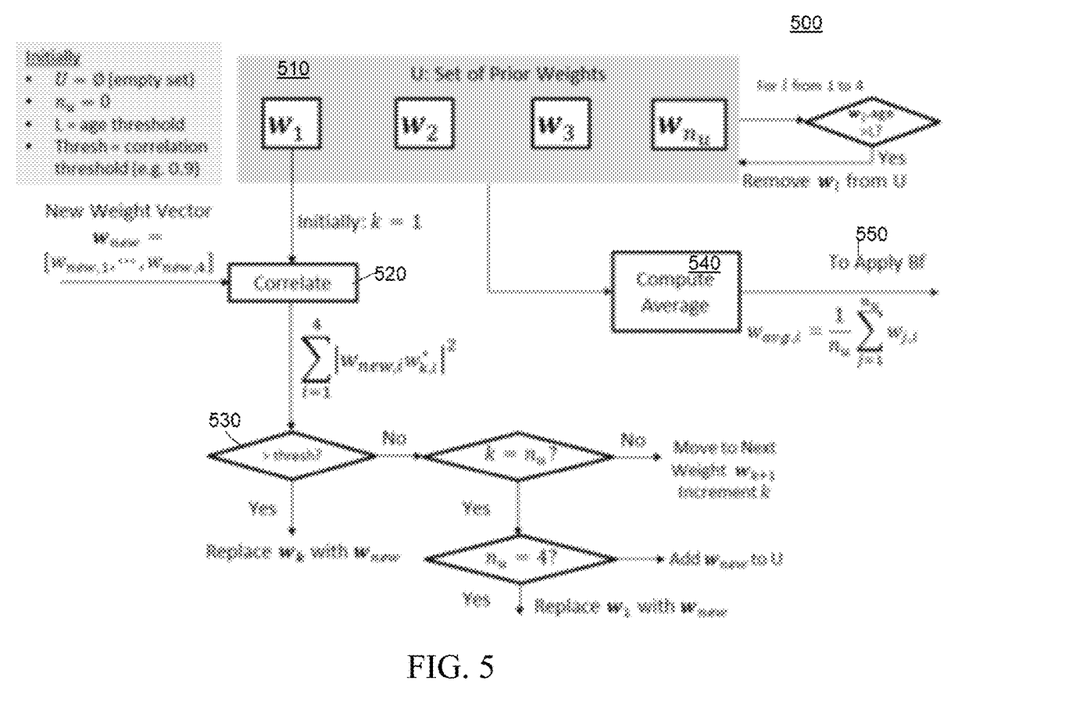
FIG. 5 depicts a workflow illustrating various aspects of some embodiments of the present invention.

FIG. 5 is a weight calculation flowgraph 500 that illustrates how one or more programs (executing on a processor or in an FPGA) determine how to calculate a new aggregate weight vector representing multiple signals of interest. As illustrated in FIG. 5, the one or more programs obtain a set of prior weights (510). The one or more programs perform a correlation (520) and determine whether a threshold was met (530). The program code also determines an average (540) to apply to the beamforming (550).

As aforementioned, embodiments of the present invention may include both hardware and software-based implementations. The software may be installed and executed on the MIMO device or it may be executed on a device that is communicatively coupled to the MIMO device. Some embodiments of the present invention include an applique device that attaches to devices (e.g., radios) and reduces interference, without modifying existing components within the device. In some embodiments of the present invention, transmission and reception devices include Internet of Things devices. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. IoT devices also include Smart home devices, digital assistants, and home entertainment devices, which comprise examples of environmental sensors. Because the smart sensors in IoT devices carry unique identifiers, a computing system that communicates with a given sensor can identify the source of the information. Within the IoT, various devices can communicate with each other and can access data from sources available over various communication networks, including the Internet. Some embodiments of the present invention include an efficient algorithm design and FPGA implementation in add-one hardware.

Figure 6:
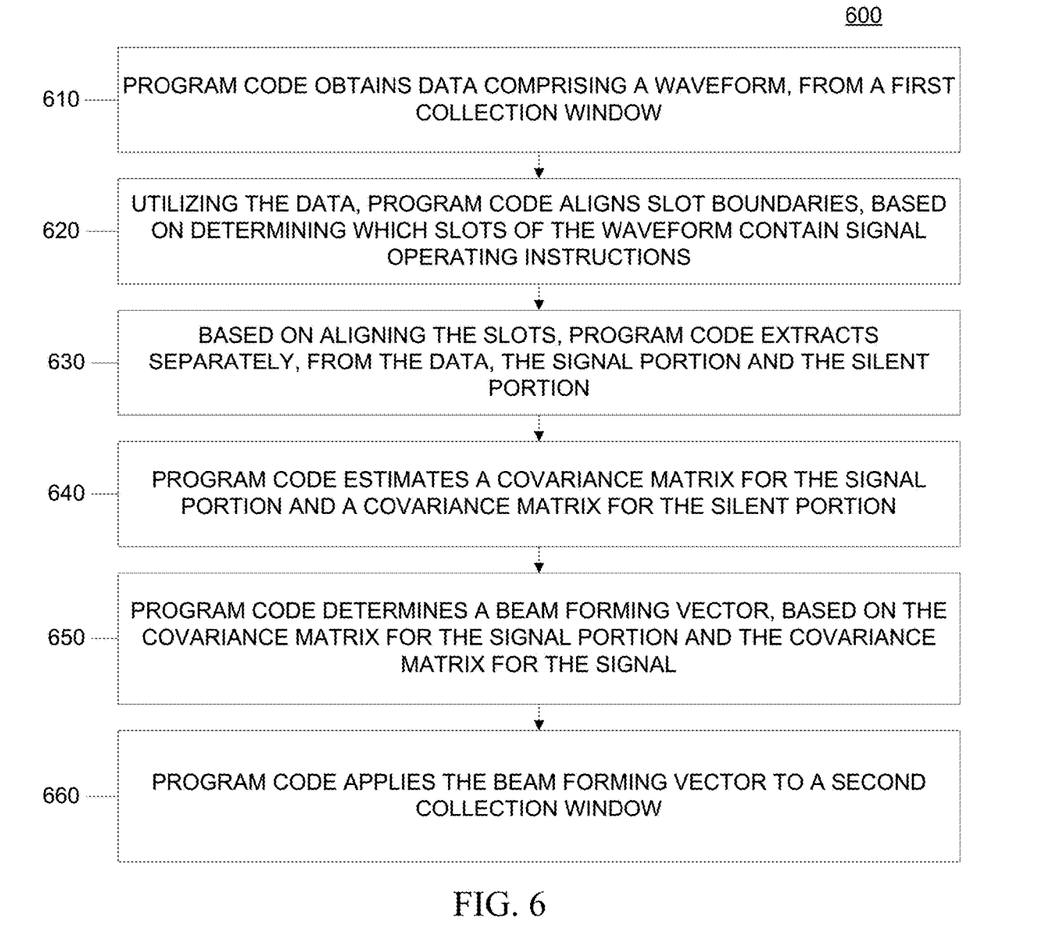
FIG. 6 is a workflow that depicts certain aspects of some embodiments of the present invention.

FIG. 6 is a workflow 600 that depicts certain aspects of some embodiments of the present invention. In some embodiments of the present invention, the program code (also referred to as one or more programs) executed by a processing circuit or comprising hardware, obtains data comprising a waveform, from a first collection window (610). Utilizing the data, the program code aligns slot boundaries, based on determining which slots of the waveform contain signal operating instructions (620). To align the slot boundaries, the program code identifies a signal portion of the slots where the signal operating instructions are transmitting and a silent portion of the slots where the signal operating instructions are not transmitting. Based on aligning the slots, the program code extracts separately, from the data, the signal portion and the silent portion (630). The program code estimates a covariance matrix for the signal portion and a covariance matrix for the silent portion (640). The program code determines a beam forming vector, based on the covariance matrix for the signal portion and the covariance matrix for the signal (650). The program code applies the beam forming vector to a second collection window (660). In some embodiments of the present invention, the second collection window is a window in time following the first collection window, which is also a window of time.

Figure 7:
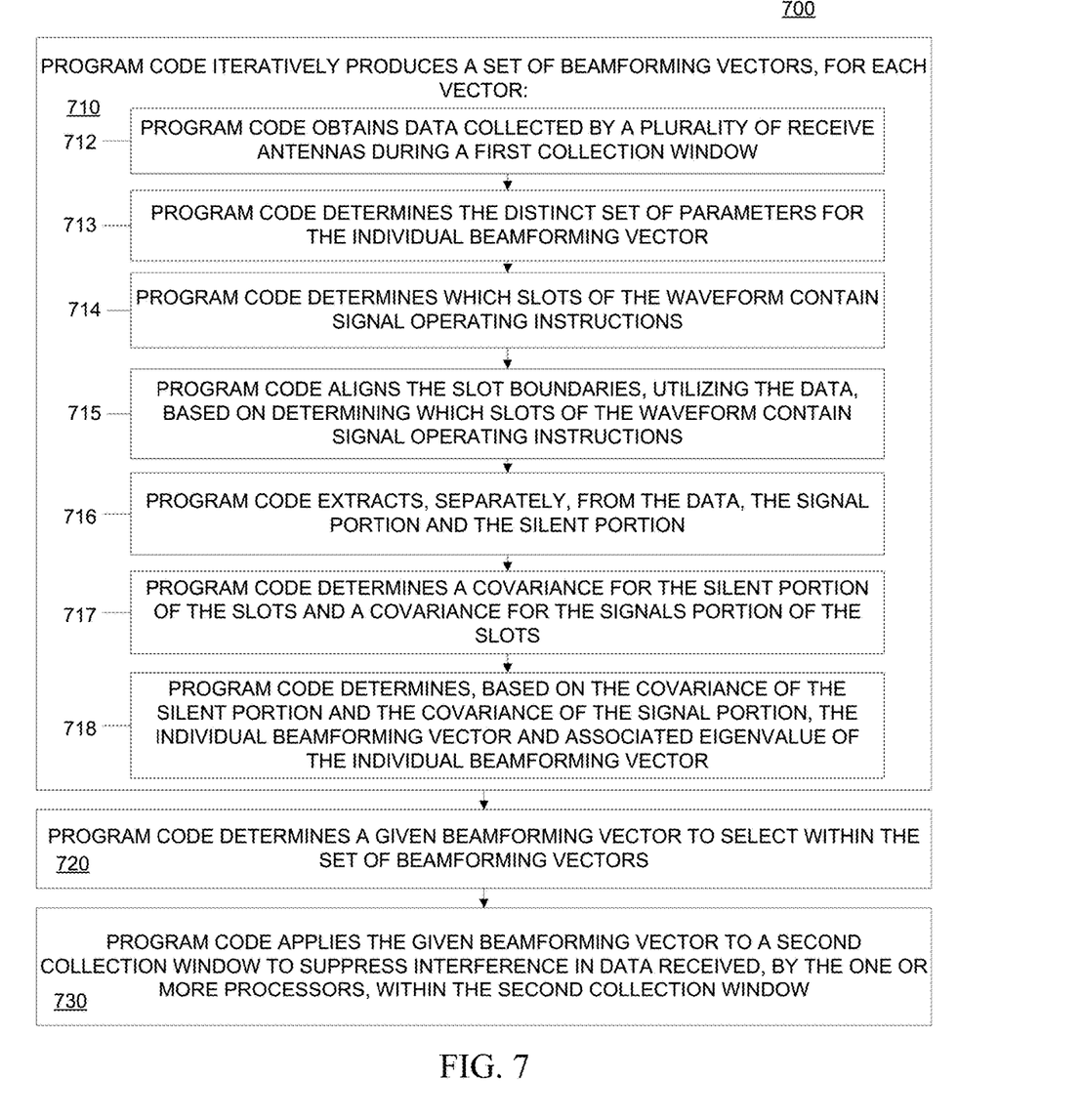
FIG. 7 is a workflow that depicts certain aspects of some embodiments of the present invention.

FIG. 7 is a workflow 700 that depicts certain aspects of some embodiments of the present invention. In an embodiment of the present invention, program code produces a set of beamforming vectors (710). In some embodiments of the present invention, the program code produced the set by producing each beamforming vector, iteratively. In this embodiment, each beamforming vector of the set is produced based on a distinct set of parameters. To produce each beamforming vector, the program code obtains data collected by a plurality of receive antennas during a first collection window (712). The waveform includes slots with slot boundaries, from a first collection window. The program code determines the distinct set of parameters for the individual beamforming vector (713). In some embodiments of the present invention, the program code determined the parameters by searching over the set of possible parameters and selecting the parameters which collectively maximize the eigenvalue (beamforming performance) as determined by the program code, based on computing the eigenvalue (e.g., FIG. 2, 235). The parameters can be defined by a silent portion length and a signal portion length. The program code determines which slots of the waveform contain signal operating instructions (714). The program code aligns the slot boundaries, utilizing the data, based on determining which slots of the waveform contain signal operating instructions (715). The program code makes these alignments by identifying the signal portion of the slots where the signal operating instructions are transmitting and the silent portion of the slots, where the signal operating instructions are not transmitting. Based on aligning the slot boundaries, the program code extracts, separately, from the data, the signal portion and the silent portion (716). The program code determines a covariance for the silent portion of the slots and a covariance for the signals portion of the slots (717). The program code determines, based on the covariance of the silent portion and the covariance of the signal portion, the individual beamforming vector and associated eigenvalue of the individual beamforming vector (718).

In some embodiments of the present invention, once the program code has produced the set of beamforming vectors, the program code determines the best beamforming vector to utilize to suppress interference in a second window (a time window that is subsequent to the first window, time-wise). Having determined a set of beamforming vectors, the program code determines a given beamforming vector to select within the set of beamforming vectors (720) as the one corresponding to a maximum eigenvalue (performance) in (e.g., FIG. 2, 235). The program code applies the given beamforming vector to a second collection window to suppress interference in data received, by the one or more processors, within the second collection window (730).

Embodiments of the present invention include a computer-implemented method, a computer program product, and a system where program code executing on one or more processors produces a set of beamforming vectors and associated eigenvalues, where the set of beamforming vectors comprises one or more individual beamforming vectors, and where each beamforming vector is produced based on a distinct set of parameters, the producing comprising, for each individual beamforming vector of the beamforming vectors: the program code obtaining, from a plurality of receive antennas communicatively coupled to the one or more processors, data comprising a waveform comprising slots, where the slots comprise slot boundaries, from a first collection window, the program code determining which slots of the waveform contain signal operating instructions, the program code aligning the slot boundaries, utilizing the data, based on determining which slots of the waveform contain signal operating instructions, where the aligning comprises identifying a signal portion of the slots where the signal operating instructions are transmitting and a silent portion of the slots, where the signal operating instructions are not transmitting, based on aligning the slot boundaries, the program code extracting, separately, from the data, the signal portion and the silent portion, the program code determining, a covariance for the silent portion of the slots and a covariance for the signal portion of the slots, and the program code determining, based on the covariance of the silent portion and the covariance of the signal portion, the individual beamforming vector and associated eigenvalue of the individual beamforming vector. The program code selects a given beamforming vector, from the set of beamforming vectors, where the given beamforming vector is associated with a maximum eigenvalue of the associated eigenvalues of the set of beamforming vectors. The program code applies the given beamforming vector to a second collection window to suppress interference in data received, within the second collection window. In some embodiments of the present invention, the program code produces the set of beamforming vectors iteratively.

In some embodiments of the present invention, the program code produces the set of beamforming vectors by determining, based on the data, the distinct set of parameters for the individual beamforming vector, where the distinct parameters comprise the silent portion length and the signal portion length. The program code can determine the distinct set of parameters for the individual beamforming vector by evaluating parameters comprising the distinct sets of parameters of the set of beamforming vectors and based on the evaluating, selecting, from the distinct sets of parameters, parameters that collectively maximize an associated eigenvalue for the individual beamforming vector. The given beamforming vector can maximize a signal-to-interference-plus-noise ratio. In some embodiments of the present invention, the program coder selects the distinct set of parameters from values consisting of: length of the slots, length of the data, and length of a guard period between data transmissions in the first collection window.

In some embodiments of the present invention, the second collection window is a next window following the first collection window.

In some embodiments of the present invention, determining the covariance for the silent portion of the slots and the covariance for the signals portion of the slots includes: the program code estimating a covariance matrix for the signal portion and a covariance matrix for the silent portion.

In some embodiments of the present invention, the program code determines the individual beamforming vector and the associated eigenvalue of the individual beamforming vector based on the covariance matrix for the signal portion and the covariance matrix for the silent portion.

In some embodiments of the present invention, the program code determines a size for the first collection window by obtaining a minimum signal-to-interference-plus-noise ratio level and processing capability of the plurality of receive antennas, and setting, a threshold number for the slots of the waveform received during the first collection window. The first collection window and the second collection window can be of a similar size.

In some embodiments of the present invention, the program code selects the given beamforming vector by testing beamforming vectors comprising the set of beamforming vectors to select the given beamforming vector based on the given beamforming vector, upon application by the one or more processors to the data, suppresses a threshold amount of interference in the data.

In some embodiments of the present invention, the program code obtains the data comprising the waveform from a plurality of receive antennas during a detection window. In some embodiments of the present invention, the program code determining the individual beamforming vector comprises the program code determining the individual beamforming vector for the first collection window, where the first collection window and the detection window are not equal, and where the first collection window includes the detection window. In some embodiments of the present invention, the detection window progressively slides from a starting point of the first collection window to an ending point in the first collection window, iteratively producing of the set of beamforming vectors.

Figure 8:
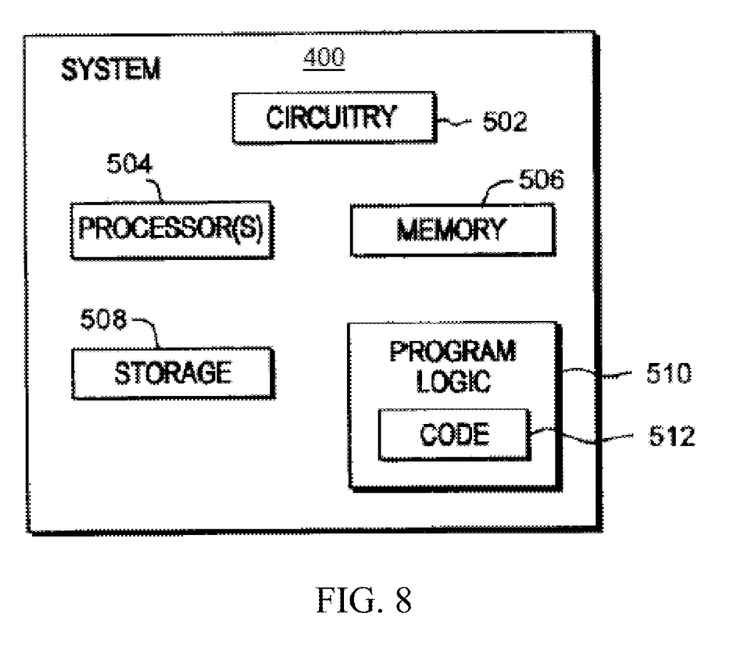
FIG. 8 depicts a computer system configured to perform an aspect of an embodiment of the present invention.

Referring to FIG. 8, in embodiments of the present invention that include software, the software may be executed by the computer resource (e.g., a processor in the device itself and/or hardware communicatively coupled to the device). FIG. 8 illustrates a block diagram of a resource 400 in computer system, such as, which is part of the technical architecture of certain embodiments of the technique. Returning to FIG. 8, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 8 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 9:
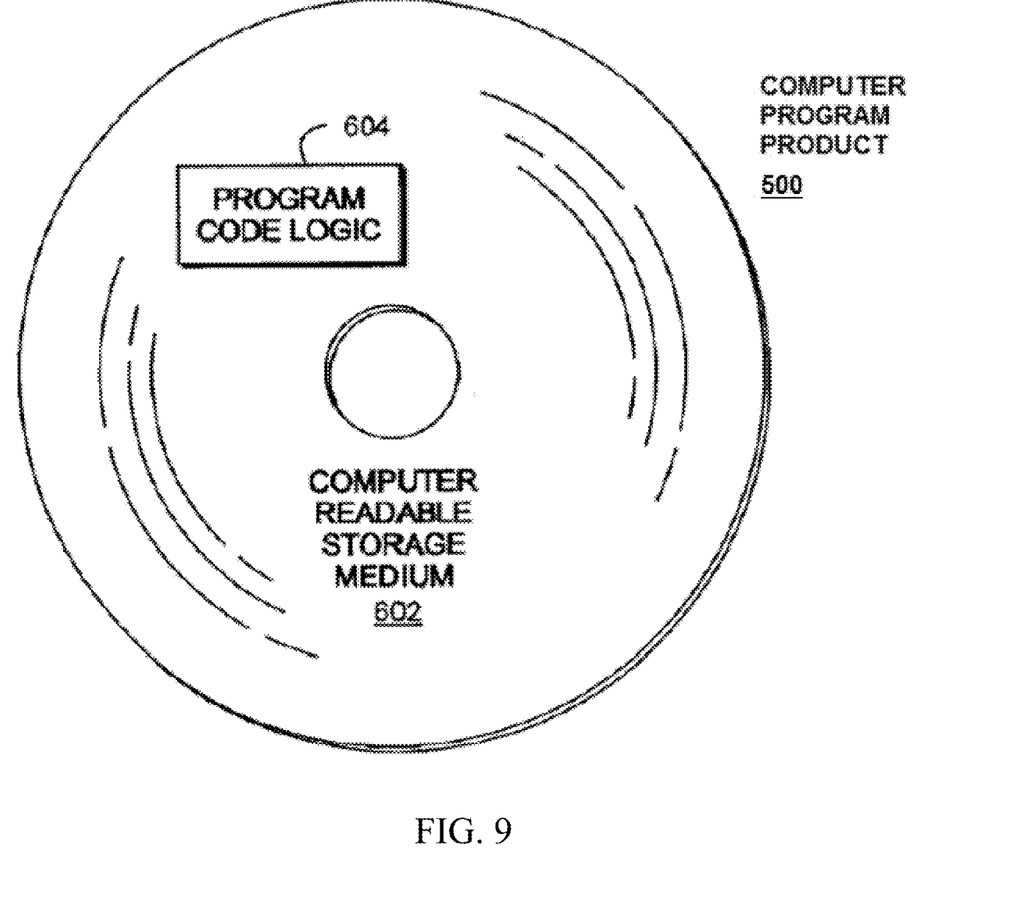
FIG. 9 depicts a computer program product incorporating one or more aspects of the present invention.

Using the processing resources of a resource 400 to execute software, computer-readable code or instructions, does not limit where this code can be stored. Referring to FIG. 9, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method, comprising:
producing, by one or more processors, a set of beamforming vectors and associated eigenvalues, wherein the set of beamforming vectors comprises one or more individual beamforming vectors, and wherein each beamforming vector is produced based on a distinct set of parameters, the producing comprising, for each individual beamforming vector of the beamforming vectors:
obtaining, by the one or more processors, from a plurality of receive antennas communicatively coupled to the one or more processors, data comprising a waveform comprising slots, wherein the slots comprise slot boundaries, from a first collection window;
determining, by the one or more processors, which slots of the waveform contain signal operating instructions;
aligning, by the one or more processors, the slot boundaries, utilizing the data, based on determining which slots of the waveform contain signal operating instructions, wherein the aligning comprises identifying a signal portion of the slots where the signal operating instructions are transmitting and a silent portion of the slots, where the signal operating instructions are not transmitting;
based on aligning the slot boundaries, extracting, by the one or more processors, separately, from the data, the signal portion and the silent portion;
determining, by the one or more processors, a covariance for the silent portion of the slots and a covariance for the signal portion of the slots; and
determining, by the one or more processors, based on the covariance of the silent portion and the covariance of the signal portion, the individual beamforming vector and associated eigenvalue of the individual beamforming vector;
selecting, by the one or more processors, a given beamforming vector, from the set of beamforming vectors, wherein the given beamforming vector is associated with a maximum eigenvalue of the associated eigenvalues of the set of beamforming vectors; and
applying, by the one or more processors, the given beamforming vector to a second collection window to suppress interference in data received, by the one or more processors, within the second collection window.

2. The computer-implemented method of claim 1, wherein producing the set of beamforming vectors is iterative.

3. The computer-implemented method of claim 1, wherein the producing further comprises:
determining, by the one or more processors, based on the data, the distinct set of parameters for the individual beamforming vector, wherein the distinct parameters comprise the silent portion length and the signal portion length.

4. The computer-implemented method of claim 3, wherein the determining the distinct set of parameters for the individual beamforming vector further comprises:
evaluating, by the one or more processors, parameters comprising the distinct sets of parameters of the set of beamforming vectors; and
based on the evaluating, selecting, by the one or more processors, from the distinct sets of parameters, parameters that collectively maximize an associated eigenvalue for the individual beamforming vector.

5. The computer-implemented method of claim 3, wherein determining the distinct set of parameters comprises selecting the distinct set of parameters from values consisting of: length of the slots, length of the data, and length of a guard period between data transmissions in the first collection window.

6. The computer-implemented method of claim 1, wherein the given beamforming vector maximizes a signal-to-interference-plus-noise ratio.

7. The computer-implemented method of claim 1, wherein the second collection window is a next window following the first collection window.

8. The computer-implemented method of claim 1, wherein determining the covariance for the silent portion of the slots and the covariance for the signals portion of the slots comprises:

estimating, by the one or more processors, a covariance matrix for the signal portion and a covariance matrix for the silent portion.

9. The computer-implemented method of claim 8, wherein determining the individual beamforming vector and the associated eigenvalue of the individual beamforming vector comprises determining the individual beamforming vector and the associated eigenvalue of the individual beamforming vector based on the covariance matrix for the signal portion and the covariance matrix for the silent portion.

10. The computer-implemented method of claim 1, further comprising:
determining, by the one or more processors, a size for the first collection window, wherein the determining comprises:
obtaining, by the one or more processors, a minimum signal-to-interference-plus-noise ratio level and processing capability of the plurality of receive antennas; and
setting, by the one or more processors, a threshold number for the slots of the waveform received during the first collection window.

11. The computer-implemented method of claim 10, wherein the first collection window and the second collection window are of a similar size.

12. The computer-implemented method of claim 1, wherein selecting the given beamforming vector comprises testing beamforming vectors comprising the set of beamforming vectors to select the given beamforming vector based on the given beamforming vector, upon application by the one or more processors to the data, suppresses a threshold amount of interference in the data.

13. The computer-implemented method of claim 1, wherein obtaining the data comprising the waveform comprises obtaining data collected by the plurality of receive antennas during a detection window, wherein determining the individual beamforming vector comprises determining the individual beamforming vector for the first collection window, wherein the first collection window and the detection window are not equal, and wherein the first collection window comprises the detection window.

14. The computer-implemented method of claim 13, wherein the detection window progressively slides from a starting point of the first collection window to an ending point in the first collection window during the producing of the set of beamforming vectors.

15. The non-transitory computer program product comprising:
a computer readable storage medium readable by one or more processors and storing instructions for execution by the one or more processors for performing a method comprising:
producing, by the one or more processors, a set of beamforming vectors and associated eigenvalues, wherein the set of beamforming vectors comprises one or more individual beamforming vectors, and wherein each beamforming vector is produced based on a distinct set of parameters, the producing comprising, for each individual beamforming vector of the beamforming vectors:
obtaining, by the one or more processors, from a plurality of receive antennas communicatively coupled to the one or more processors, data comprising a waveform comprising slots, wherein the slots comprise slot boundaries, from a first collection window;
determining, by the one or more processors, which slots of the waveform contain signal operating instructions;
aligning, by the one or more processors, the slot boundaries, utilizing the data, based on determining which slots of the waveform contain signal operating instructions, wherein the aligning comprises identifying a signal portion of the slots where the signal operating instructions are transmitting and a silent portion of the slots, where the signal operating instructions are not transmitting;
based on aligning the slot boundaries, extracting, by the one or more processors, separately, from the data, the signal portion and the silent portion;
determining, by the one or more processors, a covariance for the silent portion of the slots and a covariance for the signal portion of the slots; and
determining, by the one or more processors, based on the covariance of the silent portion and the covariance of the signal portion, the individual beamforming vector and associated eigenvalue of the individual beamforming vector;
selecting, by the one or more processors, a given beamforming vector, from the set of beamforming vectors, wherein the given beamforming vector is associated with a maximum eigenvalue of the associated eigenvalues of the set of beamforming vectors; and
applying, by the one or more processors, the given beamforming vector to a second collection window to suppress interference in data received, by the one or more processors, within the second collection window.

16. The non-transitory computer program product of claim 15, wherein producing the set of beamforming vectors is iterative.

17. The non-transitory computer program product of claim 16, wherein determining the covariance for the silent portion of the slots and the covariance for the signals portion of the slots comprises:
estimating, by the one or more processors, a covariance matrix for the signal portion and a covariance matrix for the silent portion.

18. The non-transitory computer program product of claim 15, wherein the producing further comprises:
determining, by the one or more processors, based on the data, the distinct set of parameters for the individual beamforming vector, wherein the distinct parameters comprise the silent portion length and the signal portion length.

19. The non-transitory computer program product of claim 18, wherein the determining the distinct set of parameters for the individual beamforming vector further comprises:
evaluating, by the one or more processors, parameters comprising the distinct sets of parameters of the set of beamforming vectors; and
based on the evaluating, selecting, by the one or more processors, from the distinct sets of parameters, parameters that collectively maximize an associated eigenvalue for the individual beamforming vector.

20. A system comprising:
a memory;
one or more processors in communication with the memory;
a plurality of receive antennas communicatively coupled to the one or more processors;

program instructions executable by the one or more processors via the memory to perform a method, the method comprising:

producing, by the one or more processors, a set of beamforming vectors and associated eigenvalues, wherein the set of beamforming vectors comprises one or more individual beamforming vectors, and wherein each beamforming vector is produced based on a distinct set of parameters, the producing comprising, for each individual beamforming vector of the beamforming vectors:

obtaining, by the one or more processors, from a plurality of receive antennas communicatively coupled to the one or more processors, data comprising a waveform comprising slots, wherein the slots comprise slot boundaries, from a first collection window;

determining, by the one or more processors, which slots of the waveform contain signal operating instructions;

aligning, by the one or more processors, the slot boundaries, utilizing the data, based on determining which slots of the waveform contain signal operating instructions, wherein the aligning comprises identifying a signal portion of the slots where the signal operating instructions are transmitting and a silent portion of the slots, where the signal operating instructions are not transmitting;

based on aligning the slot boundaries, extracting, by the one or more processors, separately, from the data, the signal portion and the silent portion;

determining, by the one or more processors, a covariance for the silent portion of the slots and a covariance for the signal portion of the slots; and determining, by the one or more processors, based on the covariance of the silent portion and the covariance of the signal portion, the individual beamforming vector and associated eigenvalue of the individual beamforming vector;

selecting, by the one or more processors, a given beamforming vector, from the set of beamforming vectors, wherein the given beamforming vector is associated with a maximum eigenvalue of the associated eigenvalues of the set of beamforming vectors; and applying, by the one or more processors, the given beamforming vector to a second collection window to suppress interference in data received, by the one or more processors, within the second collection window.

* * * * *